United States Patent
Wickramanayake

(12) 
(10) Patent No.: US 6,805,736 B2
(45) Date of Patent: Oct. 19, 2004

(54) PEN-COMPATIBLE BLACK AND COLOR INKJET INKS HAVING IMPROVED BLEED CONTROL

(75) Inventor: Palitha Wickramanayake, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/336,217

(22) Filed: Jan. 2, 2003

(65) Prior Publication Data

US 2004/0129171 A1 Jul. 8, 2004

(51) Int. Cl.$^7$ .............................................. C09D 11/02
(52) U.S. Cl. .................................. 106/31.6; 106/31.27
(58) Field of Search .............................. 106/31.27, 31.6

(56) References Cited

U.S. PATENT DOCUMENTS

| | | | |
|---|---|---|---|
| 5,181,045 A | 1/1993 | Shields et al. | 106/31.27 |
| 5,198,023 A | 3/1993 | Stoffel | 106/31.32 |
| 5,428,383 A | 6/1995 | Shields et al. | 347/96 |
| 5,518,534 A | 5/1996 | Pearlstine et al. | 106/31.75 |
| 5,730,790 A | 3/1998 | Rehman | 106/31.59 |
| 5,785,743 A | 7/1998 | Adamic et al. | 106/31.27 |
| 5,997,623 A * | 12/1999 | Lin | 106/31.58 |
| 6,139,139 A * | 10/2000 | Stoffel et al. | 347/96 |
| 6,383,274 B1 * | 5/2002 | Lin | 106/31.27 |
| 6,383,275 B1 * | 5/2002 | Lin | 106/31.27 |
| 6,387,168 B1 * | 5/2002 | Koitabashi et al. | 106/31.6 |
| 6,395,079 B1 * | 5/2002 | Sano | 106/31.59 |
| 6,475,271 B2 * | 11/2002 | Lin | 106/31.27 |
| 6,613,815 B2 * | 9/2003 | Lin | 523/160 |
| 2003/0000419 A1 * | 1/2003 | Takemoto | 106/31.6 |
| 2003/0051637 A1 * | 3/2003 | Klass | 106/483 |
| 2003/0061967 A1 * | 4/2003 | Satoh et al. | 106/31.89 |

FOREIGN PATENT DOCUMENTS

| | | |
|---|---|---|
| EP | 0776951 | 6/1997 |
| JP | 9-151346 | 11/1995 |
| JP | 9-151349 | 11/1995 |

* cited by examiner

*Primary Examiner*—Mark L. Bell
*Assistant Examiner*—Veronica F. Faison

(57) ABSTRACT

Ink sets that are particularly suitable for inkjet printing over a large range of uncoated papers, have reduced bleed between color and black inks, and include black and color inks that are mutually compatible in pens. The ink sets include at least one pigment-based black ink having cationic and anionic dispersant groups, and at least one color dye or pigment that interacts with the black ink when printed on a receiving medium. The black pigment is self-dispersed and is dual treated with cationic and anionic dispersant groups. When printed onto an alkaline medium, the black pigment will carry a net negative charge that will interact with the positively charged color dyes and/or pigments and, thus, be bleed arrested. When printed onto an acidic medium, the black pigment will have a positive charge, will interact with the negatively charged color dyes and/or pigments, and thus be bleed arrested.

19 Claims, No Drawings

PEN-COMPATIBLE BLACK AND COLOR INKJET INKS HAVING IMPROVED BLEED CONTROL

FIELD OF THE INVENTION

The present invention relates to inkjet inks and methods of reducing bleed in inks employed in inkjet printing. More particularly, the invention relates to an ink system, which includes a pigment-based black ink having cationic and anionic dispersant groups and at least one color dye or pigment that interacts with the black ink when printed on a receiving medium, and use of such inks and dispersant groups to reduce bleed in inkjet inks.

BACKGROUND OF THE INVENTION

Inkjet printers offer a low cost, high quality, and comparatively noise-free option to other types of printers commonly used with computers. One such type of printer employs a resistor element in a chamber provided with an egress for ink to enter from a plenum. The plenum is connected to a reservoir for storing the ink. A plurality of such resistor elements are arranged in a particular pattern (i.e., a primitive) in a printhead. Each resistor element is associated with a nozzle in a nozzle plate through which ink is expelled toward a print medium. The entire assembly of printhead and reservoir comprise an inkjet pen.

In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inkjet inks, when printed in various colors on bond paper, copier paper, and other media, can lead to bleed. Bleed occurs when colors mix on the surface of the paper being printed on and in the paper. As used herein, the term "bleed" means that, when inks of two different colors are printed next to each other, one color invades into the other and the border between the two colors becomes ragged. This definition is in contradistinction to uses of the term in the prior art, which often defines "bleed" in the context of ink of a single color following the fibers of the paper. Bleed control means that the border between the two colors is substantially clean and free from the invasion of one color into the other.

Prior solutions to bleed have largely involved the use of heated platens or other heat sources and/or special paper. Use of heated platens, however, make the manufacture of printers more expensive. Likewise, use of specialized paper or media, which is more expensive than "plain" paper, increases the cost of using the printer. Another way to reduce bleed involves increasing the penetration rate of the ink into the paper. However, increasing the penetration rate reduces the edge acuity (lowers the print quality of the ink). Nevertheless, this method is acceptable for printing color ink because of the lesser importance of color text quality. However, print quality is important for black ink and, hence, alternate bleed control mechanisms are needed.

U.S. Pat. No. 5,428,383 teaches a method to control bleed in multicolor inkjet printing that involves the use of multivalent metal salts as precipitation agents in a first ink composition. The precipitation agent is designed to react with the coloring agent in a second ink composition. A solution to the specific problem of black to yellow color bleed is disclosed in U.S. Pat. No. 5,198,023, wherein multivalent cations such as calcium chloride and magnesium chloride are added at concentrations ranging from about 1 to about 10 wt % to yellow cationic inks to prevent bleed between yellow and black inks. However, it has been determined that the addition of large amounts multivalent cations to thermal inkjet ink compositions may induce precipitation of dye salts, requiring further adjustments in the ink composition.

U.S. Pat. No. 5,518,534 teaches the use of a first ink having a pigment dispersion and a second ink containing a salt of an organic acid or mineral acid wherein said salt reacts with said first ink to alleviate bleed between the inks. However, in this case, the pigment requires the presence of a dispersing agent and both inks must have the same ionic character. U.S. Pat. No. 5,730,790 discloses an inkjet ink that includes at least one dye-based ink composition and at least one pigment-based ink. The dye-base ink also contains a cationic surfactant and the pigment-base ink contains a negatively-charged dispersant.

Another method of reducing bleed between inkjet inks involves the use of pH-sensitive dyes. For example, U.S. Pat. No. 5,181,045 discloses an ink having a pH-sensitive dye to prevent bleeding to an adjacent ink having an appropriate pH. Migration of the ink having the pH-sensitive dye is prevented by rendering the dye insoluble on the page by contact with the pH of the adjacent ink. This method requires a pH differential of about 4 or 5 units to completely control bleed. Accordingly, a pH not exceeding 4 would be required to effectively eliminate bleed from a pH-sensitive ink having a typical pH of about 8. U.S. Pat. No. 5,785,743, builds upon the previously referenced '045 patent, except that an organic acid component is added to the so-called target inkjet ink composition as opposed to the pH-sensitive ink composition. The organic acid component reduces the pH differential required to control bleed to about 3 units or less.

Each of the above has produced varying degrees of success. However, one common feature of these ink systems is that, as bleed arrest is achieved via the "reaction" of one ink with the other, if these inks are resident on the same print head, and if the inks inadvertently come in contact with each other on the same print head or on the nozzle plate, they will react and create highly undesirable reliability problems. Reactive inks are likely to form undesirable residues on the nozzle wipers and in spittoons, leading to reliability issues. Therefore, a need remains for ink compositions that are mutually compatible on the print head, while at the same time that are bleed arrested when printed on to the print medium.

SUMMARY OF THE INVENTION

The present invention is directed to ink sets that are particularly suitable for inkjet printing over a large range of uncoated papers, have reduced bleed between color and black inks, and include black and color inks that are mutually compatible in pens. The ink sets include at least one pigment-based black ink having cationic and anionic dispersant groups, and at least one color dye or pigment that interacts with the black ink when printed on a receiving medium. The black pigment is self-dispersed and is dual treated with cationic and anionic dispersant groups.

In one particular embodiment of the invention, the black ink includes a pigment that is self dispersed with COOH groups and quaternary amine groups, with the number of COOH groups being greater than the number of quaternary amine groups. The black ink is maintained acidic, the $CO_2H$ groups are unionized, and the black ink carries a positive charge (cationic). The color ink component of the ink set may include at least one dye containing at least one quaternary amine group and/or pigment that is dispersed with quaternary amine functional group(s). The color ink is maintained acidic and carries a positive charge (cationic). Due to their similar charges, the black and color inks do not interact in the print head or on the orifice plate. When printed onto an alkaline medium, as the $CO_2H$ groups ionize, the black pigment will carry a net negative charge that will interact with the positively charged color dyes and/or pigments and, thus, be bleed arrested.

In another embodiment of the invention, the black ink includes a self-dispersing black pigment and dispersing agents as described with reference to the previous embodiment. In this embodiment, however, the black ink is maintained alkaline and carries a net negative charge (anionic). The color ink component of the ink set may include at least one dye containing at least one $SO_3H$ group and/or pigment that is dispersed with $SO_3H$ functional group(s). The color ink is maintained alkaline and carries a negative (anionic) charge. Due to their similar charges, the black and color inks do not interact in the print head or on the orifice plate. When printed onto an acidic medium, the black pigment will have a positive charge, will interact with the negatively charged color dyes and/or pigments, and thus be bleed arrested.

The inks of this invention comprise, by weight, from about 0.5 to 20 wt % dye or pigment (total), up to about 50% organic solvent, and the balance mostly water. A buffer may also be employed to maintain the ink at a pH between about 4 and about 9.5 when so desired. Other adjuncts commonly found in inkjet inks, such as a biocides, metal chelating agents may also be added to the inks.

DETAILED DESCRIPTION OF THE INVENTION

The present invention is directed to inkjet ink sets having reduced bleed between color and black inks and good compatibility when used in the same print head, as well. The ink sets include at least one pigment-based, black ink that is dispersed with cationic and anionic dispersant groups, with more anionic dispersant groups being used relative to the amount of cationic dispersant groups. In a preferred embodiment of the invention, the black ink includes a self-dispersing black pigment with dispersant groups having COOH groups and quaternary amine groups, wherein the number of COOH groups is greater than the number of quaternary amine groups.

The ink set further includes at least one colorant in the form of either a dye or a pigment. The color dye(s) and/or pigment(s) are formulated such that an interaction due to opposite charges occurs with the black ink when the ink set is printed on a receiving medium, while maintaining compatibility between the black and color inks in the pen. In one particular embodiment of the invention, this is achieved by providing a black ink that is maintained acidic and which carries a positive charge (cationic). The black ink is maintained acidic and carries a positive charge. The color ink component of the ink set includes at least one dye containing at least one quaternary amine group and/or pigment that is dispersed with one or more quaternary amine functional group(s). As with the black ink, the color ink is maintained acidic and carries a positive charge (cationic). Due to their acidic nature, the black and color inks, having similar charges, do not interact on the orifice plate. However, when printed onto an alkaline medium, the black ink will have a negative charge and, thus, will interact with the positively charged color dyes and/or pigments to become bleed arrested.

In another embodiment of the invention, the black ink is maintained alkaline and carries a net negative charge (anionic). The color ink component of the ink set may include at least one dye containing one or more SO3H group(s) and/or pigment is dispersed with $SO_3H$ group(s). The color ink is maintained alkaline and carries a negative (anionic). Due to their alkaline nature and, hence, similar charges, the black and color inks do not interact on the orifice plate. When printed onto an acidic medium, the black ink will have a positive charge, will interact with the negatively charged color dyes and/or pigments, and thus become bleed arrested.

When more than one dye is employed, the ratio of the dyes may vary depending on the application. The inks preferably contain from about 0.5% to about 20%, more preferably from about 1% to about 10%, and most preferably from about 2% to about 5% by weight of the dyes or pigments, based on the total weight of the ink.

In one particular embodiment, the black pigment is dispersed in the ink composition with the aid of the dispersing agent(s). Such black pigments include any black pigment that is dispersed with the dispersant groups having the previously discussed ionic functionalities.

The color inks of the present invention comprise at least one colorant, typically dyes or pigments. The dyes or pigments may be cationic or anionic, depending on the embodiment. Any of the color dyes or pigments known for use in inkjet printing may be employed in the practice of this invention. Any dyes or pigments generally known in the art can be used to practice the invention A typical formulation for an ink useful in the practice of the invention includes one or more cosolvents (0 to about 50 wt %), one or more water-soluble surfactants/amphiphiles (0 to about 40, preferably about 1 to about 5, wt %), and water (balance).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol)alkyl ethers, higher homologs of poly(ethylene glycol)alkyl ethers, poly (propylene glycol)alkyl ethers, higher homologs of poly (propylene glycol)alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from 0 to about 50 wt %, with about 0.1 to 15 wt % being preferred.

Water-soluble surfactants may be employed in the formulation of the vehicle of the ink. Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are preferably applied to a paper medium by means of a thermal or piezo inkjet. It is understood that using a color ink that has an opposite charge to that possessed by the black ink will have a much greater effect on the bleed reduction of the inks than will any pH change caused by the pH of the paper medium. While the pH of the paper medium affects the charge possessed by the black ink upon printing of the same upon the medium, in the present application, a color ink having an opposite charge from that possessed by the black ink brings about interaction between the black and color inks and is used to bring about the desired effect, i.e., compatibility of the inks prior to printing and bleed reduction after the inks are printed onto a medium.

In order to test specific characteristics of the ink jet ink sets of the present invention, the zeta potential of a carbon black pigment was tested. It is known in the art that the characteristics of various suspensions can be altered by modifying how individual colloids interact with one another. At times, it is desirable to maximize the repulsive forces between particles (e.g., pigments) in order to keep each particle discrete and prevent them from gathering into larger, faster settling agglomerates. Alternatively, it may be desirable to increase the attractive forces between particles. As previously discussed, it may also be desirable to combine these effects to achieve particular results. One such property can be modified by varying the balance between repulsion and attraction improved bleed control and compatibility between black and color ink jet inks.

In suspensions such as those found in ink jet inks, each charged particle is surrounded by a diffuse layer of neutralizing ions. This causes an electrical potential on the order of millivolts to develop across the diffuse layer between the colloid and the bulk of the liquid. The magnitude of this potential is approximately proportional to the surface charge on the colloid, and it is called the zeta potential. It has been found that the zeta potential of a carbon black pigment, which is self-dispersed with $CO_2H$ and quaternary ammonium ions (more $CO_2H$ groups than quaternary ammonium groups) shifted from positive to negative, when the pH was taken from acid to alkaline. This shift demonstrates the charge reversal that takes place when an ink containing such a material is printed on a paper of appropriate pH.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. An inkjet ink set for inkjet printing comprising:
    a black ink comprising at least one self-dispersed pigment, said pigment being dispersed with cationic and anionic dispersant groups, provided that the number of anionic dispersant groups is greater than the number of cationic dispersant groups; and
    a color ink that interacts with said black ink after said black ink is printed on a receiving medium, said color ink comprising at least one colorant.

2. The inkjet ink of claim 1, wherein said colorant comprises a dye.

3. The inkjet ink of claim 1, wherein said colorant comprises a pigment.

4. The inkjet ink of claim 1, where said anionic dispersant groups comprise carboxylate groups.

5. The inkjet ink of claim 1, wherein said cationic dispersant groups comprise quaternary amine groups.

6. The inkjet ink of claim 1, wherein said color ink has a positive charge and wherein said black ink has a positive charge prior to being printed onto a medium and has a negative charge when printed onto an alkaline media.

7. The inkjet ink of claim 6, wherein said colorant contains quaternary amine groups.

8. The inkjet ink of claim 1, wherein said color ink has a negative charge and wherein said black ink has a negative charge prior to being printed onto a medium and has a positive charge when printed onto an acidic media.

9. The inkjet ink of claim 6, wherein said colorant contains $SO_3H$ groups.

10. An inkjet ink set for inkjet printing comprising:
    a black ink comprising at least one pigment being dispersed with dispersant groups comprising carboxylate groups and quaternary amine groups, provided that the number of carboxylate groups is greater than the number of quaternary amine groups; and
    a color ink that interacts with said black ink after said black ink is printed on a receiving medium, said color ink comprising at least one colorant.

11. The inkjet ink of claim 10, wherein said colorant comprises a dye.

12. The inkjet ink of claim 10, wherein said colorant comprises a second pigment.

13. The inkjet ink of claim 10, wherein said color ink has a positive charge and wherein said black ink has a positive charge prior to being printed onto a medium and has a negative charge when printed onto an alkaline media.

14. The inkjet ink of claim 10, wherein said color ink has a negative charge and wherein said black ink has a negative charge prior to being printed onto a medium and has a positive charge when printed onto an acidic media.

15. A method of maintaining compatibility between black and color inkjet inks and reducing black to color bleed when black and color inks are printed, the method comprising:
    formulating said black ink comprising at least one self-dispersed pigment, said pigment being dispersed with cationic and anionic dispersant groups, provided that the number of anionic dispersant groups is greater than the number of cationic dispersant groups, and
    formulating a color ink that interacts with said black ink after said black ink is printed on a receiving medium, said color ink comprising at least one colorant.

16. The method of claim 15, wherein said colorant comprises a dye or a pigment.

17. The method of claim 15, wherein said anionic dispersant groups comprise carboxylate groups and said cationic dispersant groups comprise quaternary amine groups.

18. The method of claim 15, wherein said color ink has a positive charge and wherein said black ink has a positive charge prior to being printed onto a medium and has a negative charge when printed on to an alkaline media.

19. The method of claim 15, wherein said color ink has a negative charge and said black ink has a negative charge prior to being printed onto a medium and has a positive charge when printed on to an alkaline media.

* * * * *